Oct. 20, 1925.

A. J. CAWLEY 1,557,980

ELECTRODEPOSITION PROCESS

Filed April 17, 1922

INVENTOR
Aloysius J. Cawley

Patented Oct. 20, 1925.

1,557,980

UNITED STATES PATENT OFFICE.

ALOYSIUS J. CAWLEY, OF PITTSTON, PENNSYLVANIA.

ELECTRODEPOSITION PROCESS.

Application filed April 17, 1922. Serial No. 554,112.

*To all whom it may concern:*

Be it known that I, ALOYSIUS J. CAWLEY, a citizen of the United States, and a resident of Pittston, in the county of Luzerne and State of Pennsylvania, have invented a new and Improved Electrodeposition Process, of which the following is a full, clear, and exact description.

The invention relates generally to electrodeposition; more particularly, it involves a process whereby metallic duplicates or patrices are formed from sound records carried on longitudinal strips. It is especially adapted to making metallic patrices from sound grooves carried upon the margin of negative motion picture films, so that talking picture positive records may be produced.

By this process a metallic patrix is formed in such a manner that the electrolyte does not in any way come in contact with the picture portion of the film, it being entirely confined to the portion of the film which carries the sound record. It is unnecessary to immerse the film in an electroplating bath, as the process is carried out while the film is wound upon the reel or other support. The electrolyte is held in contact with the film by means of a porous ribbon or tape.

The invention is not necessarily limited to the production of sound record patrices, as it may be used for making embossed copies of certain portions of carved work, etc.

This invention was originally a part of my application for "sound recording process," filed December 13th, 1919, Serial Number 344,708, granted June 20th, 1922, Number 1,420,304. It is also a continuation in part of my application Serial Number 165,861, filed May 2, 1917, for a process of producing a sound record.

Reference is to be had to the accompanying drawing forming a part of the specification, in which like characters of reference denote corresponding parts in all the views, and in which, Figure 1 is an elevational view of a motion picture reel provided with contact clamps, and upon which the negative film, porous strip and anode have been wound.

Figure 1:
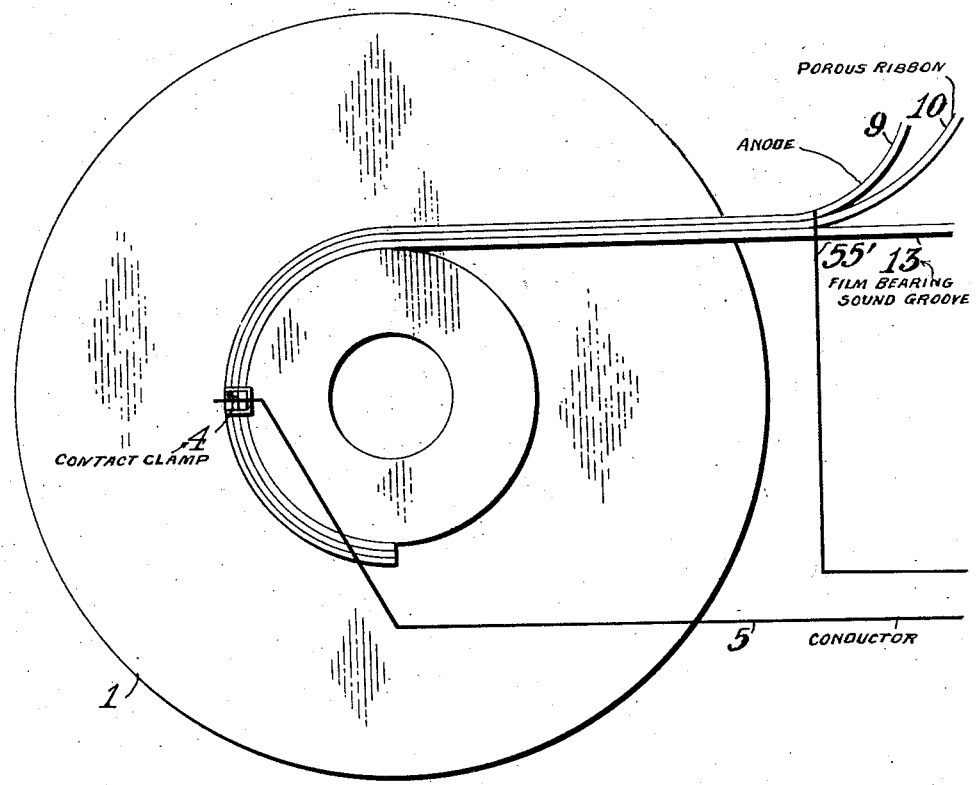

A sound groove is formed on the margin of a negative motion picture film as outlined in the above mentioned application. The celluloid film is heated by means of special apparatus only along the line of the proposed sound groove, resulting in a plasticized area. A stylus is vibrated in contact with this area so that a sound groove is produced. Obviously, this sound groove constitutes a master record. The surface of the master record thus produced on the negative film 13 is coated with a conducting substance, such as graphite, silver, etc., or the like in any of the well-known ways. Over this surface is placed a strip of porous material, 10, such as blotting paper, asbestos, mineral wool, glass wool or felt, which has been impregnated with a suitable electrolyte, such as copper sulphate, the double sulphate of nickel and ammonia, or the like. Copper is a very satisfactory metal to deposit, and is rather cheap. An acid solution may be employed having the following composition: copper sulphate 2 lbs., sulphuric acid ½ to 1 lb., added to a gallon of water. If an alkaline solution is desired, the following may be used: twenty parts of each of the following ingredients, crystallized acetate of copper, sodium carbonate, sodium bisulphite and cyanide of potassium added to 1,000 parts of water. The invention, however, is limited to no specific metal or electrolyte. This electrolyte will obviously have other ingredients in it which will improve the quality of the deposit in the well known way. A ribbon, 9 of the metal to be deposited, such as copper, is placed over the porous strip, and thus serves as an anode. The three are wound on a reel 1, or drying rack, or the like, preferably being fed thereto in a continuous manner. Connection is made at frequent intervals to the conducting coating by suitable small clamps 4, and indicated diagrammatically connected to ribbon 9; however, the connections to the ribbon could be by means of soldered joints, if desired. Those clamps may be cheaply constructed. The battery wires, or those leading to any other source of power are shown at 5 and 55'. The whole reel is thus wound with film, strip and ribbon and connections made at frequent intervals by means of clamps 4. The reel is thus laid aside in any convenient place and the current turned on for a sufficient time to allow of the formation of the patrix. This is formed obviously by passing a current from the anode 9 through the porous strip or tape 10, to the conducting surface. An even distribution of the current is secured by the frequent connections of the clamps 4. The porous tape with its contained electrolyte permits of the free movement of the ions in accordance with Faraday's law, and results in the deposition of the metallic ions at the surface of the master record.

After winding up a reel, or rack, in the above manner, it is only necessary to turn on the current and let the reel stand until a sufficient thickness of metal is deposited. Several hundred feet of film can be placed on a reel in this manner and the long duplicate, or patrix, made in the same period of time that it would take to deposit one square millimeter of patrix. In addition to this, there is the economy of electrolyte, of labor, and, due to the compact arrangement, of space. The deposition may, furthermore, be made while the reel is being shipped from one part of the laboratory to the other.

The photographic surface of the picture record is not touched by the electrolyte, etc., and it is absolutely safe from injury. It is impossible to produce a metallic duplicate or patrix from one thousand feet of film record surface by means of the ordinary plating bath, on account of its inconvenience, to say nothing of the possibility of injury to the surface itself. This is true whether the positive photosensitive surface is developed or undeveloped.

If desired, the margin carrying the master record may be severed from the main body of the film, and the operation of making a metallic duplicate from it carried on simultaneously with the development of the picture record. However, by making the duplicate in the dark before developing the negative film, any possible danger to the sound record by the developing bath will be eliminated. It must be noted though that the developing bath, being an aqueous solution, will have no injurious effect on the celluloid with its groove.

After the duplicate has been deposited, the ribbons or tapes, may be unwound from the reel and the duplicate stripped from the master record, and if desired provided with a backing strip.

The patrix which has been produced in the above manner may be attached to the negative by suitable cement, or by means of heat and pressure, and a new unitary product obtained which is capable of affording great convenience in the subsequent operations of molding the sound record and printing the picture record on the positive motion picture film, forming a talking picture record. Such a combined patrix and negative motion picture film is described in my application, Serial No. 328,299, filed October 3rd, 1919, for a "process of laterally modifying a sound record," being illustrated by Figure 7.

Figure 2:
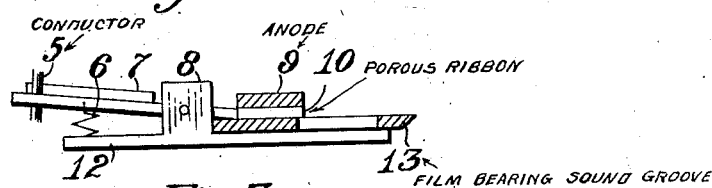
Figure 2 is an elevational view of a contact clamp.
Figure 3:
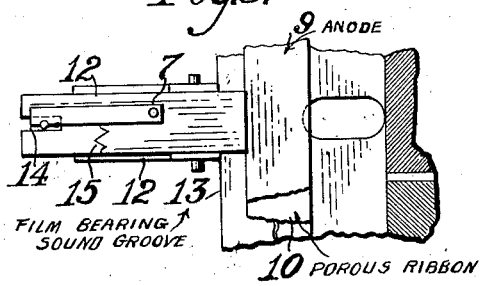
Figure 3 is a plan view of such a clamp, showing more exactly the manner in which the anode and strip are held in contact with the film.

Figures 2 and 3 show the manner of attaching the conducting wires by means of the clamps 4, the latter being illustrated in detail. The film margin 13 is clamped between the base 12 and the movable blade which is actuated by the spring 6. Anode 9 and tape 10, being wound on the reel tightly with the film, hold all three in contact. The conducting wire 5 is clamped in the groove 14 by blade 7, which is in turn actuated by the spring 15. Electrical connections are thus easily made with the surface of 13 which is directly under the strip 10, and which carries the sound groove. It is readily seen that the clamps 4 may be attached to the film, tape and anode even before they are wound upon the film. The base 12, etc., will protrude over the side of the film, and it is an easy matter to insert wire 5 in the grooves 14 of the various clamps 4. It is thought that only one connection as by 55' need be made to the anode, due to its low resistance.

Having described my invention, I claim as new and desire to secure by Letters Patent:

1. The process of electrodeposition, which consists in applying a layer of absorbent material of a specific form impregnated with electrolyte over a conducting surface and in fixed contact therewith, placing a strip of the metal to be deposited on top of said layer and establishing electrical connection between said metal strip and said conducting surface to deposit metal over a specific area of said conducting surface in accordance with the specific form of said layer.

2. The process of making sound record patrices, which consists in rendering a film surface electrically conductive, and placing a porous tape saturated with electrolyte in contact with said surface; placing a ribbon of suitable metal in contact with said tape; making electrical connections so that said ribbon acts as anode and a patrix is formed by electrodeposition on said conducting surface.

3. The process of making sound record patrices, which consists in rendering a master record surface on a motion picture film electrically conductive, and placing a porous strip saturated with suitable electrolyte in contact with said surface; placing a suitable metal ribbon in contact with said tape; making electrical connections so that said ribbon acts as anode and a patrix is formed in contact with said conducting surface.

4. The process of making sound record patrices, which consists in rendering a master record surface on a motion picture film conducting electrically, and placing a porous strip saturated with suitable electrolyte in contact with said surface; placing a suitable metal ribbon in contact with said tape, and winding all three in a continuous manner on a suitable reel or rack; making proper electrical connections with said metal ribbon and conducting surface, and turning on an electrical current so that a patrix is formed throughout the whole length of said surface simultaneously.

5. The process of making sound record patrices, which consists in winding continuously a porous strip saturated with electrolyte and a metallic ribbon, both being in contact with each other and the said tape in contact with a sound master record located on the margin of a moving picture film, and the said motion picture film upon a suitable rack; all being in proper electrical arrangement so that a metallic duplicate is formed on said conducting surface.

6. The process of making sound record patrices, which consists in placing a tape of porous material saturated with electrolyte between a sound master record located on a flexible film and a suitable metallic ribbon, wound upon a rack, and proper electrical connections made so that current passes from the metal ribbon through the tape and deposits a metallic patrix upon the surface of the master record which has been previously made electrically conductive; separating all three and stripping off the patrix, and applying a suitable backing material.

Pittston, Pa., January 3rd, 1922.

ALOYSIUS J. CAWLEY.